United States Patent [19]
Diachina et al.

[11] Patent Number: 6,016,428
[45] Date of Patent: Jan. 18, 2000

[54] REGISTRATION CONTROL OF MOBILE STATIONS IN A WIRELESS COMMUNICATION SYSTEM

[75] Inventors: John Diachina, Garner; Raymond C. Henry, Wake Forest, both of N.C.

[73] Assignee: Telefonaktiebolaget LM Ericsson, Stockholm, Sweden

[21] Appl. No.: 08/544,839

[22] Filed: Oct. 18, 1995

[51] Int. Cl.[7] .................................................. H04B 1/00
[52] U.S. Cl. ........................... 455/435; 370/329; 455/509
[58] Field of Search ................................. 455/54.2, 54.1, 455/34.1, 33.1, 56.1, 517, 521, 509, 450, 435; 379/59; 370/329, 431

[56] References Cited

U.S. PATENT DOCUMENTS

| | | | |
|---|---|---|---|
| 4,837,858 | 6/1989 | Ablay et al. | 455/509 |
| 4,887,265 | 12/1989 | Felix | 370/333 |
| 4,916,691 | 4/1990 | Goodman | 370/389 |
| 5,086,507 | 2/1992 | Mela | 455/509 |
| 5,103,445 | 4/1992 | Ostlund | 455/54.1 X |
| 5,131,010 | 7/1992 | Derrenge et al. | 455/518 X |
| 5,157,661 | 10/1992 | Kanai et al. | 455/34.1 X |
| 5,175,867 | 12/1992 | Wejke et al. | 455/33.1 |
| 5,353,332 | 10/1994 | Raith et al. | 379/59 |
| 5,450,611 | 9/1995 | Bonvallet et al. | 455/509 |

FOREIGN PATENT DOCUMENTS

| | | |
|---|---|---|
| 16330 | 6/1995 | WIPO . |

OTHER PUBLICATIONS

"Cellular System Dual–Mode Mobile Station—Base Station Compatibility Standard", EIA/TIA Interim Standard, IS–54–B, pertinent pages only, Apr. 1992.

K. Felix, "Packet Switching in Digital Cellular Systems", *Proc. 38th IEEE Vehicular Technology Conf*, pp. 414–418, Jun. 1988.

P. Decker et al., "A General Packet Radio Service Proposed for GSM", *GSM in a Future Competitive Enviroment*, Helsinki, Finland, pp. 1–20, Oct. 13, 1993.

P. Decker, "Packet Radio in GSM", *European Telecommunication Standards Institute(ETSI)*, T Doc SMG 4 58/93, pp. 1–13 (odd pages only), Feb. 12, 1993.

J. Hämäläinen et al., "Packet Data Over GSM Network", T Doc SMG 1 238/93, *ETSI*, pp. 1–8, Sep. 28, 1993.

*Primary Examiner*—Thomas Mullen
*Attorney, Agent, or Firm*—Burns, Doane, Swecker & Mathis, L.L.P.

[57] ABSTRACT

A method and device are provided for storing and maintaining parameters associated with activities relating to a first channel while a mobile station is camped on or uses a second channel. More specifically, when a parameter indicates that activities are to be executed, the mobile station returns to the first channel to execute the actions associated with the parameter. For instance, parameters associated with a DCCH may be stored when the mobile station moves from the DCCH to a packet data channel (PDCH). When a parameter indicates that activities are to be executed, the mobile station may then return to the DCCH from the PDCH and execute the actions associated with the parameter. Since the mobile station returns to the DCCH for the actions rather than staying on the PDCH, the mobile station is activated from a system perspective, on both channels.

6 Claims, 6 Drawing Sheets

| SYNC | PCF | DATA | CSFP/PCF | DATA | PCF | RSVD |
|------|-----|------|----------|------|-----|------|
| 28 | 12 | 130 | 12 | 130 | 10 | 2 |

REGISTRATION CONTROL OF MOBILE STATIONS IN A WIRELESS COMMUNICATION SYSTEM

BACKGROUND

Applicants' invention relates to electrical telecommunication, and more particularly to wireless communication systems, such as cellular and satellite radio systems, for various modes of operation (analog, digital, dual mode, etc.), and access techniques such as frequency division multiple access (FDMA), time division multiple access (TDMA), code division multiple access (CDMA), and hybrid FDMA/TDMA/CDMA. The specific aspects of the invention are directed to techniques for enhancing procedures for reception and transmission of information.

A description follows which is directed to environments in which this invention may be applied. This general description is intended to provide a general overview of known systems and associated terminology so that a better understanding of the invention can be obtained.

In North America, digital communication and multiple access techniques such as TDMA are currently provided by a digital cellular radiotelephone system called the digital advanced mobile phone service (D-AMPS), some of the characteristics of which are specified in the interim standard TIA/EIA/IS-54-B, "Dual-Mode Mobile Station-Base Station Compatibility Standard", published by the Telecommunications Industry Association and Electronic Industries Association (TIA/EIA), which publication is expressly incorporated here by reference. Because of a large existing consumer base of equipment operating only in the analog domain with frequency-division multiple access (FDMA), TIA/EIA/IS-54-B is a dual-mode (analog and digital) standard, providing for analog compatibility together with digital communication capability. For example, the TIA/EIA/IS-54-B standard provides for both FDMA analog voice channels (AVC) and TDMA digital traffic channels (DTC). The AVCs and DTCs are implemented by frequency modulating radio carrier signals, which have frequencies near 800 megahertz (MHz) such that each radio channel has a spectral width of 30 kilohertz (KHz).

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel, which may be considered a logical channel assigned to the user. As described in more detail below, digital control channels (DCCs) can also be provided for communicating control signals, and such a DCC is a logical channel formed by a succession of usually non-consecutive time slots on the radio carrier.

In only one of many possible embodiments of a TDMA system as described above, the TIA/EIA/IS-54-B standard provided that each TDMA frame consists of six consecutive time slots and has a duration of 40 milliseconds (msec). Thus, each radio channel can carry from three to six DTCs (e.g., three to six telephone conversations), depending on the source rates of the speech coder/decoders (codecs) used to digitally encode the conversations. Such speech codecs can operate at either full-rate or half-rate. A full-rate DTC requires twice as many time slots in a given time period as a half-rate DTC, and in TIA/EIA/IS-54-B, each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output, and the remaining bits are used for guard times and overhead signalling for purposes such as synchronization.

It can be seen that the TDMA cellular system operates in a buffer-and-burst, or discontinuous-transmission, mode: each mobile station transmits (and receives) only during its assigned time slots. At full rate, for example, a mobile station might transmit during slot 1, receive during slot 2, idle during slot 3, transmit during slot 4, receive during slot 5, and idle during slot 6, and then repeat the cycle during succeeding TDMA frames. Therefore, the mobile station, which may be battery-powered, can be switched off, or sleep, to save power during the time slots when it is neither transmitting nor receiving.

In addition to voice or traffic channels, cellular radio communication systems also provide paging/access, or control, channels for carrying call-setup messages between base stations and mobile stations. According to TIA/EIA/IS-54-B, for example, there are twenty-one dedicated analog control channels (ACCs), which have predetermined fixed frequencies for transmission and reception located near 800 MHz. Since these ACCs are always found at the same frequencies, they can be readily located and monitored by the mobile stations.

For example, when in an idle state (i.e., switched on but not making or receiving a call), a mobile station in a TIA/EIA/IS-54-B system tunes to and then regularly monitors the strongest control channel (generally, the control channel of the cell in which the mobile station is located at that moment) and may receive or initiate a call through the corresponding base station. When moving between cells while in the idle state, the mobile station will eventually "lose" radio connection on the control channel of the "old" cell and tune to the control channel of the "new" cell. The initial tuning and subsequent re-tuning to control channels are both accomplished automatically by scanning all the available control channels at their known frequencies to find the "best" control channel. When a control channel with good reception quality is found, the mobile station remains tuned to this channel until the quality deteriorates again. In this way, mobile stations stay "in touch" with the system.

While in the idle state, a mobile station must monitor the control channel for paging messages addressed to it. For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations to page the called mobile station by transmitting over their respective control channels paging messages that contain the mobile identification number (MIN) of the called mobile station. Each idle mobile station receiving a paging message compares the received MIN with its own stored MIN. The mobile station with the matching stored MIN transmits a page response over the particular control channel to the base station, which forwards the page response to the MSC.

Upon receiving the page response, the MSC selects an AVC or a DTC available to the base station that received the page response, switches on a corresponding radio transceiver in that base station, and causes that base station to send a message via the control channel to the called mobile station that instructs the called mobile station to tune to the selected voice or traffic channel. A through-connection for the call is established once the mobile station has tuned to the selected AVC or DTC.

The performance of the system having ACCs that is specified by TIA/EIA/IS-54-B has been improved in a system having digital control channels (DCCHs) that is specified in TIA/EIA/IS-136, which publication is expressly incorporated here by reference. Using such DCCHs, each TIA/EIA/IS-54-B radio channel can carry DTCs only, DCCHs only, or a mixture of both DTCs and DCCHs. Within the TIA/EIA/IS-54-B framework, each radio carrier frequency can have up to three full-rate DTCs/DCCHs, or six half-rate DTCs/DCCHs, or any combination in between, for example, one full-rate and four half-rate DTCs/DCCs.

In general, however, the transmission rate of the DCCH need not coincide with the half-rate and full-rate specified in TIA/EIA/IS-54-B, and the length of the DCC slots may not be uniform and may not coincide with the length of the DTC slots. The DCCH may be defined on an TIA/EIA/IS-54-B radio channel and may consist, for example, of every n-th slot in the stream of consecutive TDMA slots. In this case, the length of each DCCH slot may or may not be equal to 6.67 msec, which is the length of a DTC slot according to TIA/EIA/IS-54-B. Alternatively (and without limitation on other possible alternatives), these DCCH slots may be defined in other ways known to one skilled in the art.

In cellular telephone systems, an air link protocol is required in order to allow a mobile station to communicate with the base stations and MSC. The communications link protocol is used to initiate and to receive cellular telephone calls. The communications link protocol is commonly referred to within the communications industry as a Layer 2 protocol, and its functionality includes the delimiting, or framing, of Layer 3 messages. These Layer 3 messages may be sent between communicating Layer 3 peer entities residing within mobile stations and cellular switching systems. The physical layer (Layer 1) defines the parameters of the physical communications channel, e.g., radio frequency spacing, modulation characteristics, etc. Layer 2 defines the techniques necessary for the accurate transmission of information within the constraints of the physical channel, e.g., error correction and detection, etc. Layer 3 defines the procedures for reception and processing of information transmitted over the physical channel.

Figure 1:
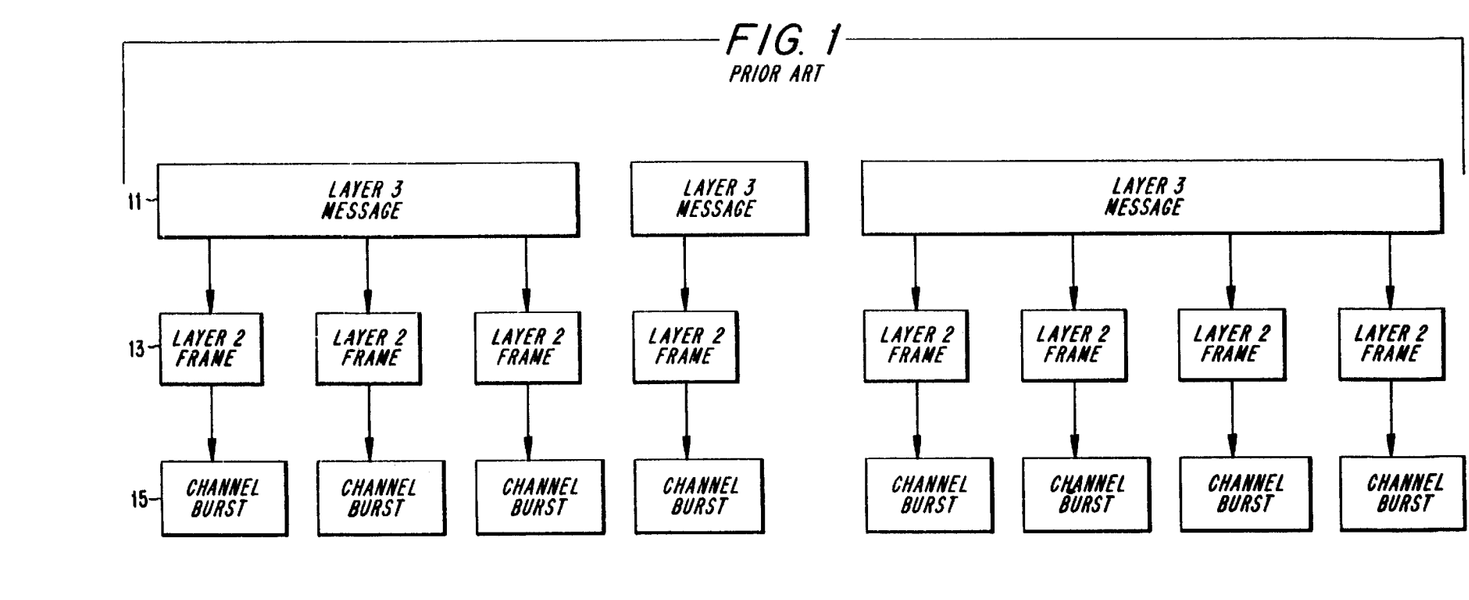
FIG. 1 schematically illustrates pluralities of Layer 3 messages, Layer 2 frames, and Layer 1 channel bursts, or time slots.
Figures 2A, 2B:
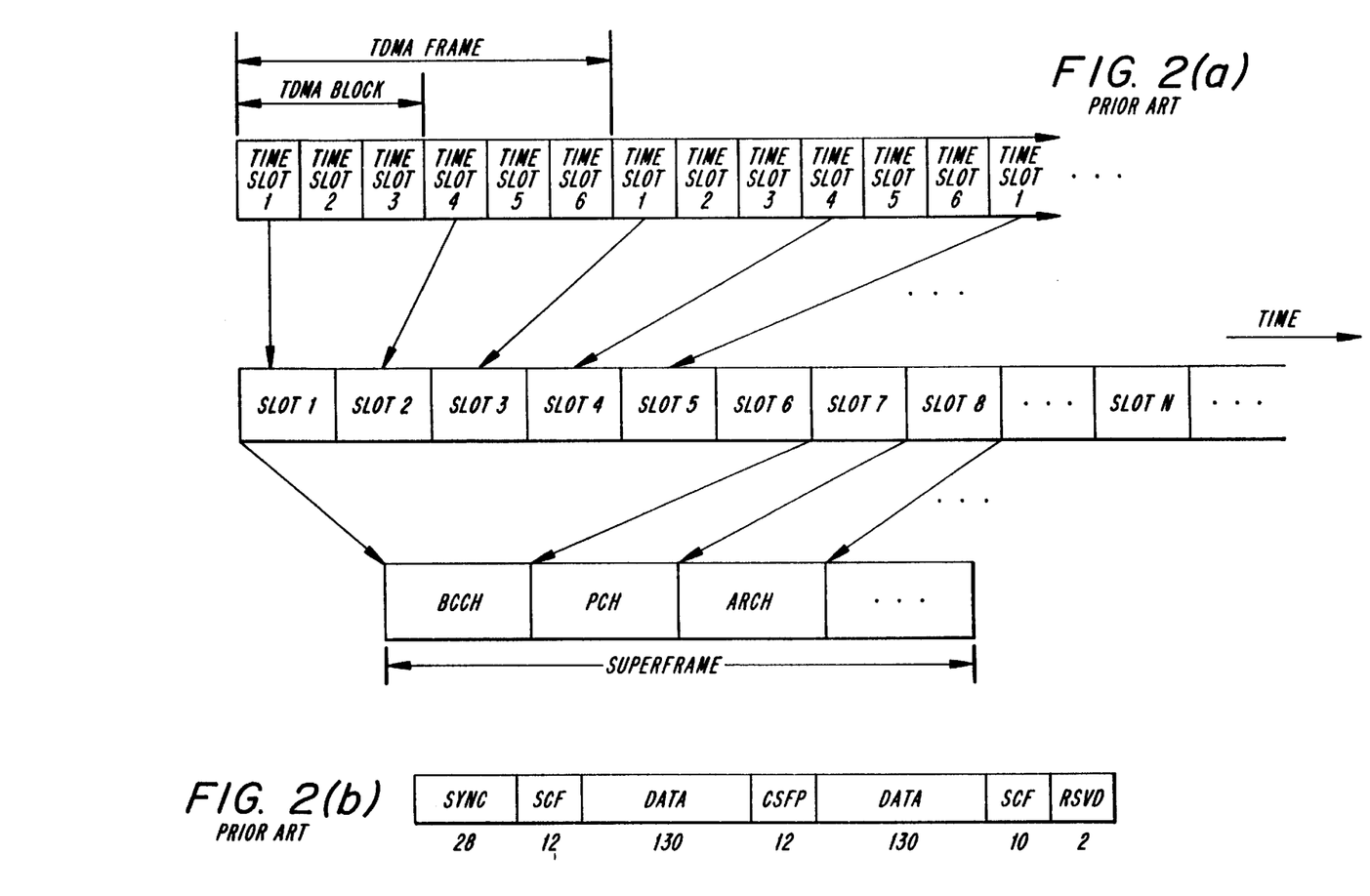
FIG. 2(a) shows a forward DCCH configured as a succession of time slots included in the consecutive time slots sent on a carrier frequency.
FIG. 2(b) shows an example of an IS-136 DCCH field slot format.

Communications between mobile stations and the cellular switching system (the base stations and the MSC) can be described in general with reference to FIGS. 1 and 2. FIG. 1 schematically illustrates pluralities of Layer 3 messages 11, Layer 2 frames 13, and Layer 1 channel bursts, or time slots, 15. In FIG. 1, each group of channel bursts corresponding to each Layer 3 message may constitute a logical channel, and as described above, the channel bursts for a given Layer 3 message would usually not be consecutive slots on an TIA/EIA/136 carrier. On the other hand, the channel bursts could be consecutive; as soon as one time slot ends, the next time slot could begin.

Each Layer 1 channel burst 15 contains a complete Layer 2 frame as well as other information such as, for example, error correction information and other overhead information used for Layer 1 operation. Each Layer 2 frame contains at least a portion of a Layer 3 message as well as overhead information used for Layer 2 operation. Although not indicated in FIG. 1, each Layer 3 message would include various information elements that can be considered the payload of the message, a header portion for identifying the respective message's type, and possibly padding.

Each Layer 1 burst and each Layer 2 frame is divided into a plurality of different fields. In particular, a limited-length DATA field in each Layer 2 frame contains the Layer 3 message 11. Since Layer 3 messages have variable lengths depending upon the amount of information contained in the Layer 3 message, a plurality of Layer 2 frames may be needed for transmission of a single Layer 3 message. As a result, a plurality of Layer 1 channel bursts may also be needed to transmit the entire Layer 3 message as there is a one-to-one correspondence between channel bursts and Layer 2 frames.

As noted above, when more than one channel burst is required to send a Layer 3 message, the several bursts are not usually consecutive bursts on the radio channel. Moreover, the several bursts are not even usually successive bursts devoted to the particular logical channel used for carrying the Layer 3 message. Since time is required to receive, process, and react to each received burst, the bursts required for transmission of a Layer 3 message are usually sent in a staggered format, as schematically illustrated in FIG. 2(a) and as described above in connection with the TIA/EIA/IS-136 standard.

FIG. 2(a) shows a general example of a forward (or downlink) DCCH configured as a succession of time slots 1, 2, ..., N, ... included in the consecutive time slots 1, 2, ... sent on a carrier frequency. These DCCH slots may be defined on a radio channel such as that specified by TIA/EIA/IS-136, and may consist, as seen in FIG. 2(a) for example, of every n-th slot in a series of consecutive slots. Each DCCH slot has a duration that may or may not be 6.67 msec, which is the length of a DTC slot according to the TIA/EIA/IS-136 standard.

As shown in FIG. 2(a), the DCCH slots may be organized into superframes (SF), and each superframe includes a number of logical channels that carry different kinds of information. One or more DCCH slots may be allocated to each logical channel in the superframe. The exemplary downlink superframe in FIG. 2(a) includes three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 2(a) may be dedicated to other logical channels, such as additional paging channels PCH or other channels. Since the number of mobile stations is usually much greater than the number of slots in the superframe, each paging slot is used for paging several mobile stations that share some unique characteristic, e.g., the last digit of the MIN.

FIG. 2(b) illustrates a preferred information format for the slots of a forward DCCH. The invention transmitted in each slot comprises a plurality of fields, and FIG. 2(b) indicates the number of bits in each field above that field. The bits sent in the SYNC field are used in a conventional way to help ensure accurate reception of the coded superframe phase (CSFP) and DATA fields. The SYNC field includes a predetermined bit pattern used by the base stations to find the start of the slot. The shared channel feedback (SCF) field is used to control a random access channel (RACH), which is used by the mobile to request access to the system. The CSFP field conveys a coded superframe phase value that enables the mobile stations to find the start of each superframe. This is just one example for the information format in the slots of the forward DCCH.

For purposes of efficient sleep mode operation and fast cell selection, the BCCH may be divided into a number of sub-channels. A BCCH structure is known that allows the mobile station to read a minimum amount of information when it is switched on (when it locks onto a DCCH) before being able to access the system (place or receive a call). After being switched on, an idle mobile station needs to regularly monitor only its assigned PCH slots (usually one in each superframe); the mobile can sleep during other slots. The ratio of the mobile's time spent reading paging messages and its time spent asleep is controllable and represents a tradeoff between call-set-up delay and power consumption.

Since each TDMA time slot has a certain fixed information carrying capacity, each burst typically carries only a portion of a Layer 3 message as noted above. In the uplink direction, multiple mobile stations attempt to communicate with the system on a contention basis, while multiple mobile stations listen for Layer 3 messages sent from the system in the downlink direction. In known systems, any given Layer 3 message must be carried using as many TDMA channel bursts as required to send the entire Layer 3 message.

Digital control and traffic channels are desirable for reasons, such as supporting longer sleep periods for the mobile units, which results in longer battery life.

Digital traffic channels and digital control channels have expanded functionality for optimizing system capacity and supporting hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

Figure 3:
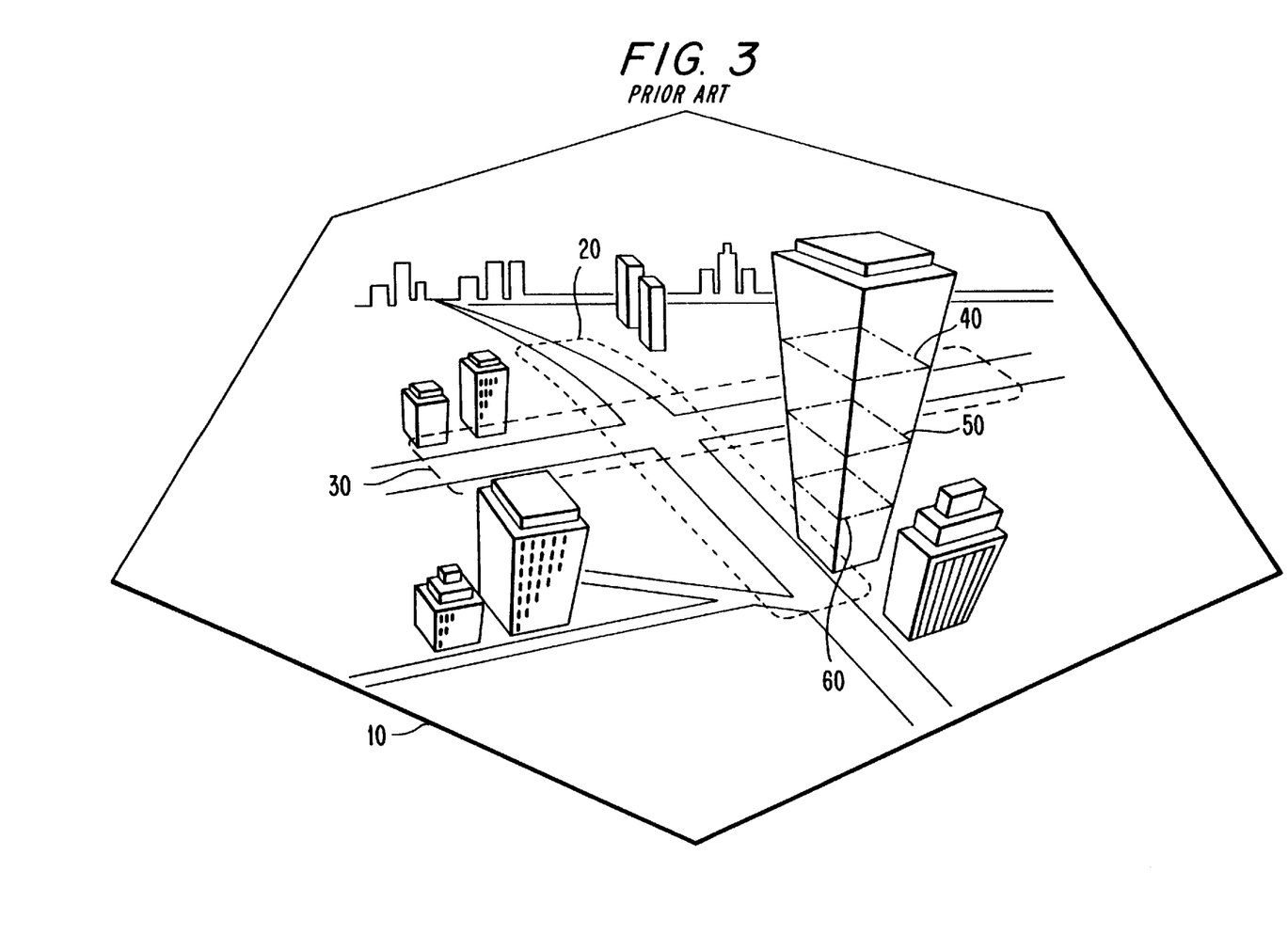
FIG. 3 illustrates an exemplary hierarchical, or multi-layered, cellular system.

FIG. 3 is an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

Figure 4:
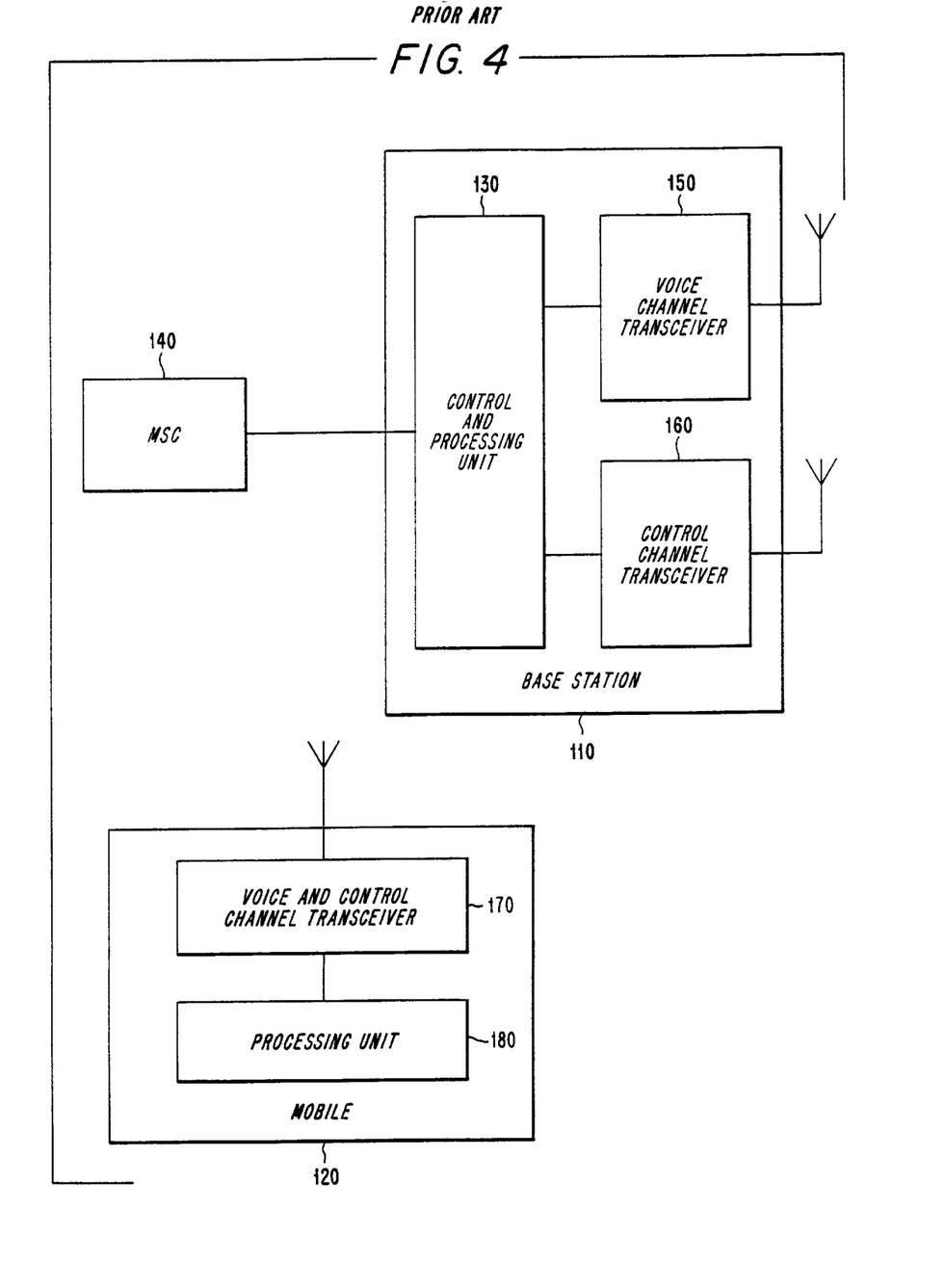
FIG. 4 is a block diagram of an exemplary cellular mobile radiotelephone system, including an exemplary base station and mobile station.

FIG. 4 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," which is incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCHs and DTCs that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

To increase the user's "talk time", i.e., the battery life of the mobile station, a digital forward control channel (base station to mobile station) may be provided that can carry the types of messages specified for current analog forward control channels (FOCCs), but in a format which allows an idle mobile station to read overhead messages when locking onto the FOCC and thereafter only when the information has changed; the mobile sleeps at all other times. In such a system, some types of messages are broadcast by the base stations more frequently than other types, and mobile stations need not read every message broadcast.

The systems specified by the TIA/EIA/IS-54-B and TIA/EIA/IS-136 standards are circuit-switched technology, which is a type of "connection-oriented" communication that establishes a physical call connection and maintains that connection for as long as the communicating end-systems have data to exchange. The direct connection of a circuit switch serves as an open pipeline, permitting the end-systems to use the circuit for whatever they deem appropriate. While circuit-switched data communication may be well suited to constant-bandwidth applications, it is relatively inefficient for low-bandwidth and "bursty" applications.

Packet-switched technology, which may be connection-oriented (e.g., X.25) or "connectionless" (e.g., the Internet Protocol, "IP"), does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers", stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

Packet transmission along a route that takes into consideration path metrics, as opposed to a single circuit set up, offers application and communications flexibility. It is also how most standard local area networks (LANs) and wide area networks (WANs) have evolved in the corporate environment. Packet switching is appropriate for data communications because many of the applications and devices used, such as keyboard terminals, are interactive and transmit data in bursts. Instead of a channel being idle while a user inputs more data into the terminal or pauses to think about a problem, packet switching interleaves multiple transmissions from several terminals onto the channel.

Packet data provides more network robustness due to path independence and the routers' ability to select alternative paths in the event of network node failure. Packet switching, therefore, allows for more efficient use of the network lines. Packet technology offers the option of billing the end user based on amount of data transmitted instead of connection time. If the end user's application has been designed to make efficient use of the air link, then the number of packets transmitted will be minimal. If each individual user's traffic is held to a minimum, then the service provider has effectively increased network capacity.

Packet networks are usually designed and based on industry-wide data standards such as the open system interface (OSI) model or the TCP/IP protocol stack. These standards have been developed, whether formally or de facto, for many years, and the applications that use these protocols are readily available. The main objective of standards-based networks is to achieve interconnectivity with other networks. The Internet is today's most obvious example of such a standards-based network pursuit of this goal.

Packet networks, like the Internet or a corporate LAN, are integral parts of today's business and communications environments. As mobile computing becomes pervasive in these environments, wireless service providers such as those using TIA/EIA/IS-136 are best positioned to provide access to these networks. Nevertheless, the data services provided by or proposed for cellular systems are generally based on the circuit-switched mode of operation, using a dedicated radio channel for each active mobile user.

A few exceptions to data services for cellular systems based on the circuit-switched mode of operation are described in the following documents, which include the packet data concepts.

U.S. Pat. No. 4,887,265 and "Packet Switching in Digital Cellular Systems", *Proc. 38th IEEE Vehicular Technology Conf.*, pp. 414–418 (June 1988) describe a cellular system providing shared packet data radio channels, each one capable of accommodating multiple data calls. A mobile station requesting packet data service is assigned to a particular packet data channel using essentially regular cellular signalling. The system may include packet access points (PAPS) for interfacing with packet data networks. Each packet data radio channel is connected to one particular PAP and is thus capable of multiplexing data calls associated with that PAP. Handovers are initiated by the system in a manner that is largely similar to the handover used in the same system for voice calls. A new type of handover is added for those situations when the capacity of a packet channel is insufficient.

These documents are data-call oriented and based on using system-initiated handover in a similar way as for regular voice calls. Applying these principles for providing general purpose packet data services in a TDMA cellular system would result in spectrum-efficiency and performance disadvantages.

U.S. Pat. No. 4,916,691 describes a new packet mode cellular radio system architecture and a new procedure for routing (voice and/or data) packets to a mobile station. Base stations, public switches via trunk interface units, and a cellular control unit are linked together via a WAN. The routing procedure is based on mobile-station-initiated handovers and on adding to the header of any packet transmitted from a mobile station (during a call) an identifier of the base station through which the packet passes. In case of an extended period of time between subsequent user information packets from a mobile station, the mobile station may transmit extra control packets for the purpose of conveying cell location information.

The cellular control unit is primarily involved at call establishment, when it assigns to the call a call control number. It then notifies the mobile station of the call control number and the trunk interface unit of the call control number and the identifier of the initial base station. During a call, packets are then routed directly between the trunk interface unit and the currently serving base station.

The system described in U.S. Pat. No. 4,916,691 is not directly related to the specific problems of providing packet data services in TDMA cellular systems.

"Packet Radio in GSM", European Telecommunications Standards Institute (ETSI) T Doc SMG 4 58/93 (Feb. 12, 1993) and "A General Packet Radio Service Proposed for GSM" presented during a seminar entitled "GSM in a Future Competitive Environment", Helsinki, Finland (Oct. 13, 1993) outline a possible packet access protocol for voice and data in GSM. These documents directly relate to TDMA cellular systems, i.e., GSM, and although they outline a possible organization of an optimized shared packet data channel, they do not deal with the aspects of integrating packet data channels in a total system solution.

"Packet Data over GSM Network", T Doc SMG 1 238/93, ETSI (Sep. 28, 1993) describes a concept of providing packet data services in GSM based on first using regular GSM signalling and authentication to establish a virtual channel between a packet mobile station and an "agent" handling access to packet data services. With regular signalling modified for fast channel setup and release, regular traffic channels are then used for packet transfer. This document directly relates to TDMA cellular systems, but since the concept is based on using a "fast switching" version of existing GSM traffic channels, it has disadvantages in terms of spectrum efficiency and packet transfer delays (especially for short messages) compared to a concept based on optimized shared packet data channels.

Cellular Digital Packet Data (CDPD) System Specification, Release 1.0 (July 1993), which specification is expressly incorporated here by reference, describes a concept for providing packet data services that utilizes available radio channels on current Advanced Mobile Phone Service (AMPS) systems, i.e., the North American analog cellular system. CDPD is a comprehensive, open specification endorsed by a group of U.S. cellular operators. Items covered include external interfaces, air link interfaces, services, network architecture, network management, and administration.

The specified CDPD system is to a large extent based on an infrastructure that is independent of the existing AMPS infrastructure. Commonalities with AMPS systems are limited to utilization of the same type of radio frequency channels and the same base station sites (the base station used by CDPD may be new and CDPD specific) and employment of a signalling interface for coordinating channel assignments between the two systems.

Routing a packet to a mobile station is based on, first, routing the packet to a home network node (home Mobile Data Intermediate System, MD-IS) equipped with a home location register (HLR) based on the mobile station address; then, when necessary, routing the packet to a visited, serving MD-IS based on HLR information; and finally transferring the packet from the serving MD-IS via the current base station, based on the mobile station reporting its cell location to its serving MD-IS.

Although the CDPD System Specification is not directly related to the specific problems of providing packet data services in TDMA cellular systems that are addressed by this application, the network aspects and concepts described in the CDPD System Specification can be used as a basis for the network aspects needed for an air link protocol in accordance with this invention.

The CDPD network is designed to be an extension of existing data communications networks and the AMPS cellular network. Existing connectionless network protocols may be used to access the CDPD network. Since the network is always considered to be evolving, it uses an open network design that allows the addition of new network layer protocols when appropriate. The CDPD network services and protocols are limited to the Network Layer of the OSI model and below. Doing so allows upper-layer protocols and applications development without changing the underlying CDPD network.

From the mobile subscriber's perspective, the CDPD network is a wireless mobile extension of traditional networks, both data and voice. By using a CDPD service provider network's service, the subscriber is able seamlessly to access data applications, many of which may reside on traditional data networks. The CDPD system may be viewed as two interrelated service sets: CDPD network support services and CDPD network services.

CDPD network support services perform duties necessary to maintain and administer the CDPD network. These services are: accounting server; network management system; message transfer server; and authentication server. These services are defined to permit interoperability among service providers. As the CDPD network evolves technically beyond its original AMPS infrastructure, it is anticipated that the support services shall remain unchanged. The functions of network support services are necessary for any mobile network and are independent of radio frequency (RF) technology.

CDPD network services are data transfer services that allow subscribers to communicate with data applications. Additionally, one or both ends of the data communications may be mobile.

To summarize, there is a need for a system providing general purpose packet data services in D-AMPS cellular systems, based on providing shared packet-data channels optimized for packet data. This application is directed to systems and methods that provide the combined advantages of a connection-oriented network like that specified by the TIA/EIA/IS-136 standard and a connectionless, packet data network. Furthermore, this invention is directed to accessing the CDPD network, for example, by existing connectionless network protocols with low complexity and high throughput.

SUMMARY

In accordance with one aspect of the invention, there is provided a method for storing and maintaining parameters associated with activities relating to a first channel while a mobile station is camped on or uses a second channel. More specifically, when a parameter indicates that activities are to be executed, the mobile station returns to the first channel to execute the actions associated with the parameter. For instance, parameters associated with a DCCH may be stored when the mobile station moves from the DCCH to a packet data channel (PDCH). When a parameter indicates that activities are to be executed, the mobile station may then return to the DCCH from the PDCH and execute the actions associated with the parameter. Since the mobile station returns to the DCCH for the actions rather than staying on the PDCH, the mobile station is active from a system perspective, on both channels.

BRIEF DESCRIPTION OF THE DRAWINGS

The features and advantages of Applicants' invention will be understood by reading this description in conjunction with the drawings in which.

DETAILED DESCRIPTION

The protocol and procedures for connectionless communication between mobile stations and base stations in accordance with this invention are directed to maximizing performance characteristics. Other desirable expansions of functionality by this invention include introducing PDCH paging areas and registration, as per IS-136 for example, providing the option to send Layer 3 messages defined for connectionless communication on a connection-oriented DTC, providing for IS-136 paging indicators while on the PDCH and providing for dedicated PDCH notification while on a DTC. One exemplary set of specific protocols and procedures for enhancing aspects of various connectionless communication between mobile stations and base stations is discussed below.

Figure 5:
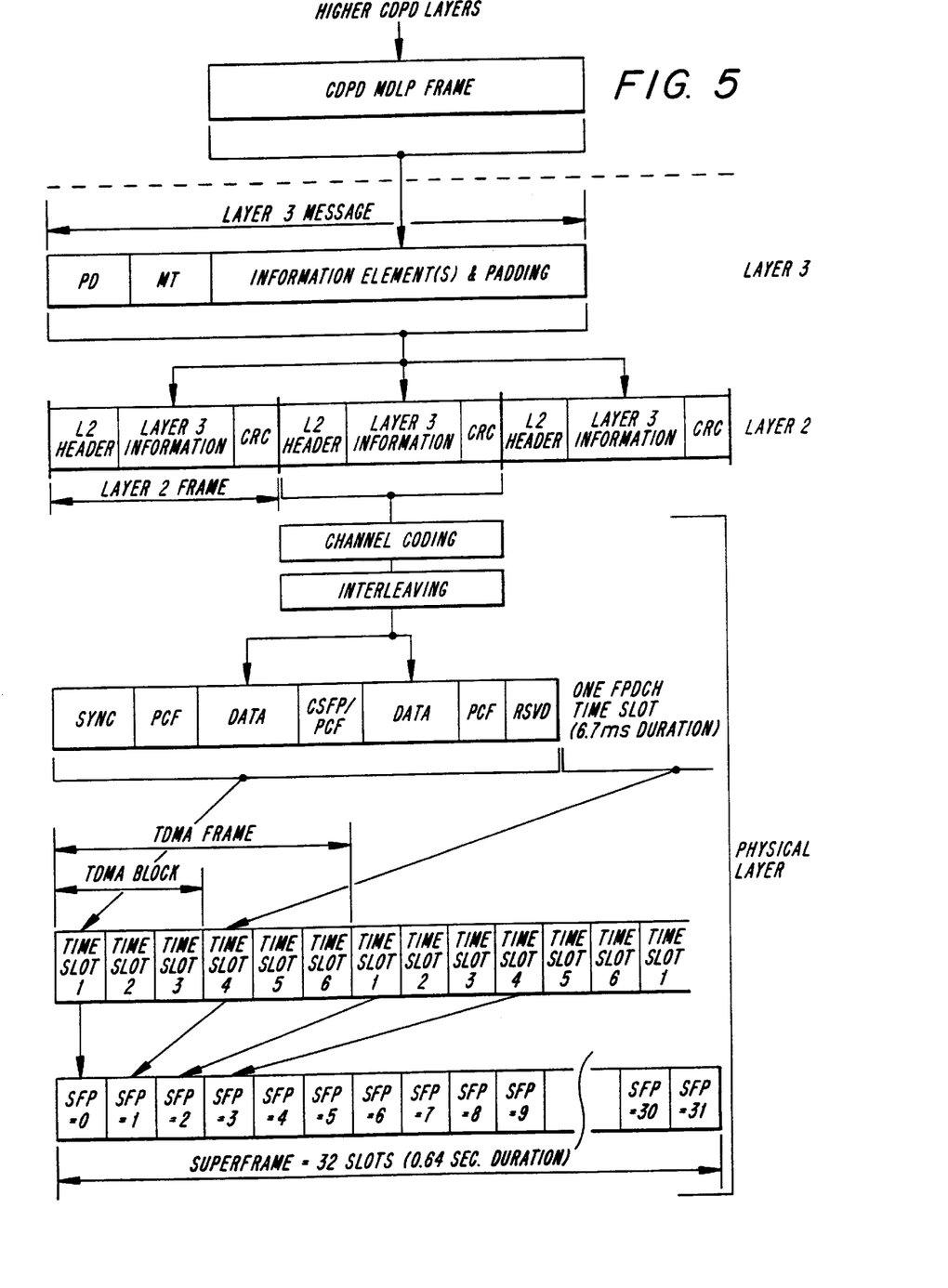
FIG. 5 illustrates one example of a possible mapping sequence between layers of a radiocommunication system.
Figure 6:
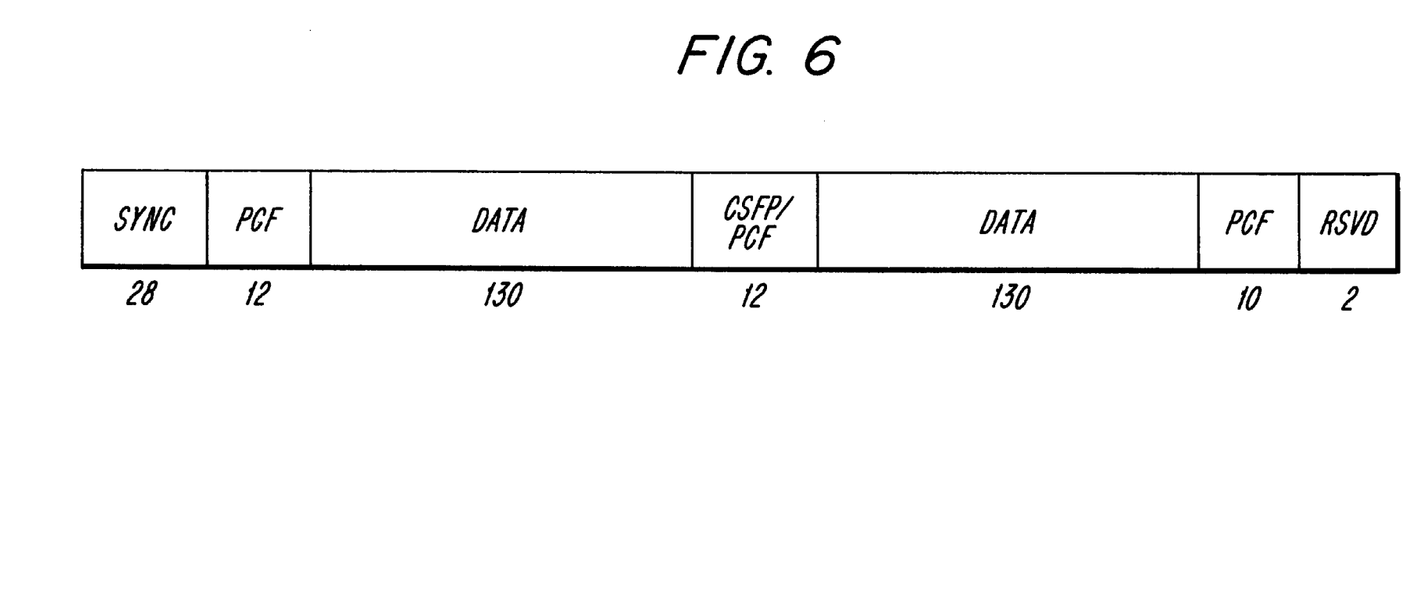
FIG. 6 shows the contents of a packet data time slot.

To aid in understanding, one exemplary layer mapping sequence is illustrated in FIG. 5. Beginning with a CDPD mobile data link protocol (MDLP) frame, this information is mapped into a Layer 3 message. The Layer 3 message, including a protocol discriminator (PD) and Message Type (MT) field, is mapped into several Layer 2 frames. Next, one of the Layer 2 frames is mapped onto a time slot, and an example of time slot mapping onto a PDCH channel. The length of the forward PDCH (FPDCH) time slots and reverse PDCH (RPDCH) bursts are fixed, although there may be three forms of RPDCH bursts which have different fixed lengths. The FPDCH slot and the full-rate PDCH are assumed to be on the physical layer in FIG. 5. This description assumes the TDMA frame structure is that of the IS-136 DCCH and DTC. In the interest of maximal throughput when a multi-rate channel is used (double-rate PDCH and triple-rate PDCH), an additional FPDCH slot format is specified. The interested reader is directed to U.S. patent application Ser. No. 08/544,493, entitled "A Method for Compensating Time Dispersion in a Communication System" to Raith et al., filed on Oct. 18, 1995 and U.S. patent application Ser. No. 08/544,490, entitled "Bandwidth Allocation" to Raith et al., filed on Oct. 18, 1995, the disclosure of both applications being expressly incorporated here by reference.

In an aspect of the invention, a mobile station may return to a first channel from a second channel when a parameter indicates that activities are to be executed. The mobile station returns to the first channel and executes the actions that are associated with the parameter that have been stored and maintained while the mobile station is on the second channel. Therefore, the mobile station is activated, from a system perspective, on both channels. Upon initially entering a PDCH camping state, the mobile station reads a full cycle of the fast packet broadcast control channel (F-PBCCH) and the extended packet broadcast control channel (E-PBCCH) on the current PDCH if the mobile station has entered the PDCH camping state directly from the DCCH camping state on its mother DCCH. Messages sent on the F-PBCCH and the E-PBCCH subchannels are received by the mobile station while in the PDCH camping state. The mobile station continues to receive all such messages until it has received the full set being transmitted by the base station. Also, the mobile station reads a full cycle if the mobile station has entered the PDCH camping state from the DCCH as a result of responding to a notification on the mother DCCH indicating that the packet data was received. The mobile station will not make an access attempt until first completing the initial reading of the full cycle of the F-PBCCH.

After reading the F-PBCCH, the mobile station is able to make access attempts and can process PDCH origination, PDCH termination, and PDCH registration transactions. When entering the PDCH camping state to operate in the PDCH-only mode, the mobile station updates and stores information and status of the neighbor list entries on the mother DCCH immediately prior to entering the PDCH camping state. The neighbor list entries are brought over because the same list can be used for cell reselection while on the PDCH. If the mobile station enters the PDCH camping state with the intent to operate in both PDCH and IS-136 modes, the mobile station maintains information and status of an additional set of stored values and counters of status information. The set of values and counters stored and maintained include neighbor list entries, PER_TMR, REREG_TMR, TMSI_TMR, REGID, NXTREG, REGID_PER, REGPER, and DCCH Assigned PFC, as specified per IS-136, for example. If one of the timers in this set expires, the mobile station returns to the DCCH from the PDCH and executes the actions associated with the expired parameters. In other words, the mobile station returns to the mother DCCH for activities instead of staying on the PDCH to respond to the associated actions on the PDCH and to maintain this information as necessary. Alternately, if the mobile station were to stay on the PDCH to perform DCCH transactions, such as DCCH registration, the amount of integration between IS-136 and PDCH is increased and more network complexity is introduced.

When a mobile station alternates between PDCH and regular cellular operation, a large amount of time will be spent camping on the mother DCCH. To enable the mobile station to be ready to receive packets, it is desirable to avoid any overhead activities, such as registration. Therefore, the present embodiment allows the mobile station to return to the PDCH from the DCCH, once the mobile station has registered itself on the PDCH, without any need for further registration on the PDCH since the mobile station has made its whereabouts known to the PDCH system.

The mobile station may camp on the mother DCCH before moving to the assigned PDCH to initiate PDCH activity when originating a packet transaction, but before originating the PDCH activity, the access parameters must be read to determine the rules for accessing. Therefore, the F-PBCCH is read. In other words, the rules for accessing must be obtained by reading a minimum amount of information from the overhead broadcast information before sending the transaction. This is possible because the mobile station has already registered itself on the PDCH and has therefore made its whereabouts known to the PDCH system. Accordingly, time is saved since re-registration is not necessary.

When terminating a packet transaction and the mobile station is camping on the mother DCCH, the mobile station is paged on the DCCH to indicate a terminating packet transaction. The mobile station then responds to the page on the DCCH and moves to the assigned PDCH without any need for further registration on the PDCH. Thereafter, the F-PBCCH is read and the mobile station is ready to receive terminating packet transactions.

In an alternate embodiment of this invention, a change flag on the DCCH may be used to indicate a change of the F-PBCCH while camping on the DCCH. If the flag is set to indicate such a change, the mobile station moves from the DCCH to the F-PBCCH. After the mobile station reads the F-PBCCH and obtains the changed information, it returns to the DCCH and enters the DCCH camping state. Thereafter, if the mobile station moves to the PDCH to originate or terminate packet data transmission, it is not necessary to read the F-PBCCH since the changes have been updated while camping on the DCCH. This technique also saves time since the F-PBCCH does not have to be read when originating or terminating packet data transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for maintaining parameters associated with functions in a wireless communication system, comprising the steps of:
   (a) maintaining functions associated with parameters on a first channel;
   (b) determining on a second channel whether one of the parameters indicates that functions associated with said one parameter are to be executed after a mobile station moves from said first channel to said second channel;

(c) returning to said first channel from said second channel when said one parameter indicates that functions are to be executed at step (b); and (d) executing the functions associated with said one parameter on said first channel.

2. A method according to claim 1, wherein said first channel is a digital control channel (DCCH) and said second channel is a packet data control channel (PDCH).

3. A method according to claim 2, wherein the mobile station returns to said PDCH from said DCCH without registration after having been previously registered on said PDCH.

4. A system for maintaining parameters associated with functions in a wireless communication system, comprising:

a memory for maintaining functions associated with parameters on a first channel;

a detector for determining on a second channel whether one of the parameters indicates that functions associated with said one parameter are to be executed after a mobile station changes from said first channel to said second channel;

means for returning to said first channel from said second channel when said one parameter indicates that functions are to be executed; and a processor for executing the functions associated with said one parameter on said first channel.

5. A system according to claim 4, wherein said first channel is a digital control channel (DCCH) and said second channel is a packet data control channel (PDCH).

6. A system according to claim 5, wherein the mobile station returns to said PDCH from said DCCH without registration after having been previously registered on said PDCH.

* * * * *